United States Patent [19]

Hitzrot, Jr.

[11] 4,190,422
[45] Feb. 26, 1980

[54] METALLIC ABRASIVE PRODUCED FROM A STEEL MILL WASTE MATERIAL

[75] Inventor: Henry W. Hitzrot, Jr., Bethlehem, Pa.

[73] Assignee: Bethlehem Steel Corporation, Bethlehem, Pa.

[21] Appl. No.: 965,550

[22] Filed: Dec. 1, 1978

Related U.S. Application Data

[63] Continuation-in-part of Ser. No. 906,310, May 16, 1978, abandoned, which is a continuation-in-part of Ser. No. 800,116, May 24, 1977, abandoned.

[51] Int. Cl.$^2$ ............................ C21D 7/06; B24C 1/10
[52] U.S. Cl. ........................................ 51/309; 51/293;
  51/320; 75/0.5 BA; 241/20; 241/24; 241/27
[58] Field of Search ................. 51/309, 307, 308, 293,
  51/320, 281, 319; 75/0.5 BA, 0.5 BC; 148/6,
  31.5; 241/24, 9, 11, 27, 29, 20

[56] References Cited

U.S. PATENT DOCUMENTS

| | | | |
|---|---|---|---|
| 466,277 | 12/1891 | Lindsey | 51/309 |
| 1,453,120 | 4/1923 | Beaver | 51/309 |
| 2,368,282 | 1/1945 | Wulff | 51/309 |
| 2,529,722 | 11/1950 | Chester | 51/309 |
| 2,796,338 | 6/1957 | Haberl | 51/309 |
| 2,895,816 | 7/1959 | Cline | 51/309 |
| 4,118,459 | 10/1978 | Falkenhain | 51/309 |

*Primary Examiner*—Donald J. Arnold
*Attorney, Agent, or Firm*—Joseph J. O'Keefe; Charles A. Wilkinson; John S. Simitz

[57] ABSTRACT

A method for preparing a steel mill waste material comprised of inner metallic cores encased in outer shells of iron oxides for use as size-graded metallic abrasives and the product so produced are described.

The waste material is screened to simultaneously separate it from all the foreign matter collected therewith and also to separate it into a fraction containing particles larger than about 6.35 mm and a fraction containing particles smaller than about 6.35 mm. The fraction containing the particles larger is recycled in the steel mill. The fraction containing the smaller particles is charged into a grinding mill containing appropriate grinding media. The smaller fraction remains in the mill for a time so that the outer shells are broken into small pieces substantially all of which are removed from the surfaces of the inner cores. The pieces of the shells and the metallic cores are separated from each other by screening. The metallic cores are graded into a plurality of sizes by screening. The pieces of shells are recycled in the plant.

The metallic cores have a microstructure of untempered lath-like martensite substantially free from intergranular and intragranular cracking, a hardness of about $R_c$ 20 to 35, and a grain size of between about 3 and 4 and are characterized by having good impact toughness and extended service life.

20 Claims, 3 Drawing Figures

METALLIC ABRASIVE PRODUCED FROM A STEEL MILL WASTE MATERIAL

CROSS-REFERENCES

This is a continuation-in-part of application Ser. No. 906,310 filed May 16, 1978 now abandoned which is a continuation-in-part of application Ser. No. 800,116 filed May 24, 1977 now abandoned entitled "Method For Treating Waste Product to Produce Metallic Abrasive Material."

BACKGROUND OF THE INVENTION

This invention is directed to preparing a steel mill waste material for use as metallic abrasives. More specifically, this invention is directed to a method for preparing scarfer spittings, a steel mill waste material, for use as size-graded metallic abrasives which can be used in machine or manual equipment to blast clean the surfaces of metals and non-metals and to the metallic abrasive so produced.

Scarfer spittings are a steel mill waste material produced by scarfing steel ingots, blooms, slabs, billets and bars prior to or during processing to remove surface defects. Scarfing consists of rapidly removing the surface of steel by the use of a fuel containing oxygen applied to the surface by means of a torch or torches. The oxygen oxidizes a portion of the steel thereby generating heat and increasing the temperature to cause the steel to become molten. The partially oxidized generally globular product is referred to as scarfer spittings. The scarfer spittings are cooled and flushed from the surface of the steel by high pressure water and are collected in a water bath. The scarfer spittings range in size from less than a #100 sieve size, that is, less than 0.149 mm to larger than 50.8 mm in diameter. The spittings are comprised of an outer shell of iron oxides surrounding an inner metallic core which has a chemical composition similar to that of the scarfed steel.

Scarfer spittings have no specific use. In recent years efforts have been directed to recycling the spittings in the steel mill to recover the iron which they contain. A portion of the spittings are mixed with mill scale, steel borings and the like and are used as part of the charge to a sinter strand to recover the iron. However, only the larger sized particles or spittings can be so used. Hence, most of the spittings must be removed from the mill and stored. In recent years, increased emphasis on the surface cleanliness of steel has resulted in an increase in the use of automatic scarfing machines to scarf the steel surfaces. As a result, the volume of scarfer spittings produced in a steel mill has increased, thereby increasing the time required to transport the spittings and the amount of storage space required for the spittings.

It is an object of this invention to provide a method for preparing scarfer spittings for a specific use whereby the problems of handling and storing of scarfer spittings in the steel mill are substantially reduced, if not completely eliminated.

It is the object of this invention to provide a method for preparing scarfer spittings comprised of inner metallic cores and outer brittle shells of iron oxides for use in machine or manual blast cleaning equipment to blast clean metallic and non-metallic surfaces.

It is another object of this invention to provide a product having a hardness of about $R_c$ 20 to 35 and a lathlike martensitic matrix which can be used as size-graded metallic abrasives having good toughness, extended service life and improved cleaning efficiency when compared with commercially available size-graded steel shot and grit abrasives.

SUMMARY OF THE INVENTION

According to this invention, a steel plant waste material, scarfer spittings, is prepared for use as size-graded metallic abrasives suitable to clean the metallic and non-metallic surfaces by machine or manual blasting techniques. Scarfer spittings are generally spherical particles ranging in size from plus 50.8 mm to minus #100 sieve size. Scarfer spittings have a dual structure comprised of inner metallic cores encased within brittle outer shells comprised substantially of iron oxides. To prepare the scarfer spittings for use as metallic abrasives, they are screened on a first screen to separate them from all large foreign matter which is inadvertently collected with them. Simultaneously, a size separation of the spittings is made, for example, at about 6.35 mm to separate substantially all the plus 6.35 mm spittings from the minus 6.35 mm spittings. The fraction containing the larger particles is recycled to the steel mill and is used as a source of iron. The fraction containing the smaller particles is charged into a grinding mill containing appropriate grinding media. The smaller fraction remains in the mill for a time to allow the grinding media to impinge upon the surface of the brittle shells and fracture the shells into relatively fine pieces substantially all of which fall away from the surfaces of the metallic cores. The grinding media does not affect the surfaces of the metallic cores hence the cores remain substantially unchanged. The mixture of metallic cores and the pieces of shells is screened in a second screening step using a #30 to #40 sieve size to separate some of the cores from substantially all the shells and simultaneously make a size separation of the cores. The plus #30 to #40 sieve fraction, which is comprised substantially of metallic cores, is stored. The minus #30 to #40 sieve fraction, which is comprised of some metallic cores and substantially all the shells, is screened in a third screening step on a sieve within the range of #100 to #120 sieve to separate substantially all the metallic cores which are larger than about #100 sieve from the metallic cores which are smaller than about #100 sieve and the broken shells. The cores in the plus #100 sieve fraction are stored with the plus #30 to #40 sieve fraction from the second screening. The minus about #100 sieve fraction is recycled to the steel mill. The mixture of plus #30 to #40 sieve fraction and plus about #100 sieve fraction cores is dried in a rotary drier prior to being screened on a series of sieves into a plurality of sizes to make size-graded metallic abrasives. The sized cores are used as metallic abrasives in blast cleaning equipment to machine or manually blast clean metallic and non-metallic surfaces.

The metallic cores have a microstructure comprised of lath-like untempered martensite substantially devoid of retained austenite and intergranular and intragranular cracking, a grain size of about 3 to 4, and a hardness of about $R_c$ 20 to 35 and are characterized by having good impact resistance and extended service life when compared to commercially available steel shot and grit. A major portion of the cores have irregular or sub-angular surfaces while a minor portion are spherical and have smooth surfaces.

FIGURES OF THE INVENTION

PREFERRED EMBODIMENT OF THE INVENTION

In a detailed description of the invention, a steel mill waste material, i.e., scarfer spittings, which has particles within the size range of coarser than 50.8 mm (2 inches) to finer than #100 sieve size, comprised of a dual structure of inner metallic cores encased in brittle outer shells which are substantially all iron oxides, is prepared for use as metallic abrasives. The scarfer spittings are treated to fracture and remove the shells from around the cores. The cores are then graded as to size and are used as metallic abrasives in machine or manual blast cleaning equipment to clean metallic and non-metallic surfaces. The metallic cores are separated or graded as to size on a series of sieves to meet the size requirements of SAE Shot and Grit Specifications J444.

Figure 1:
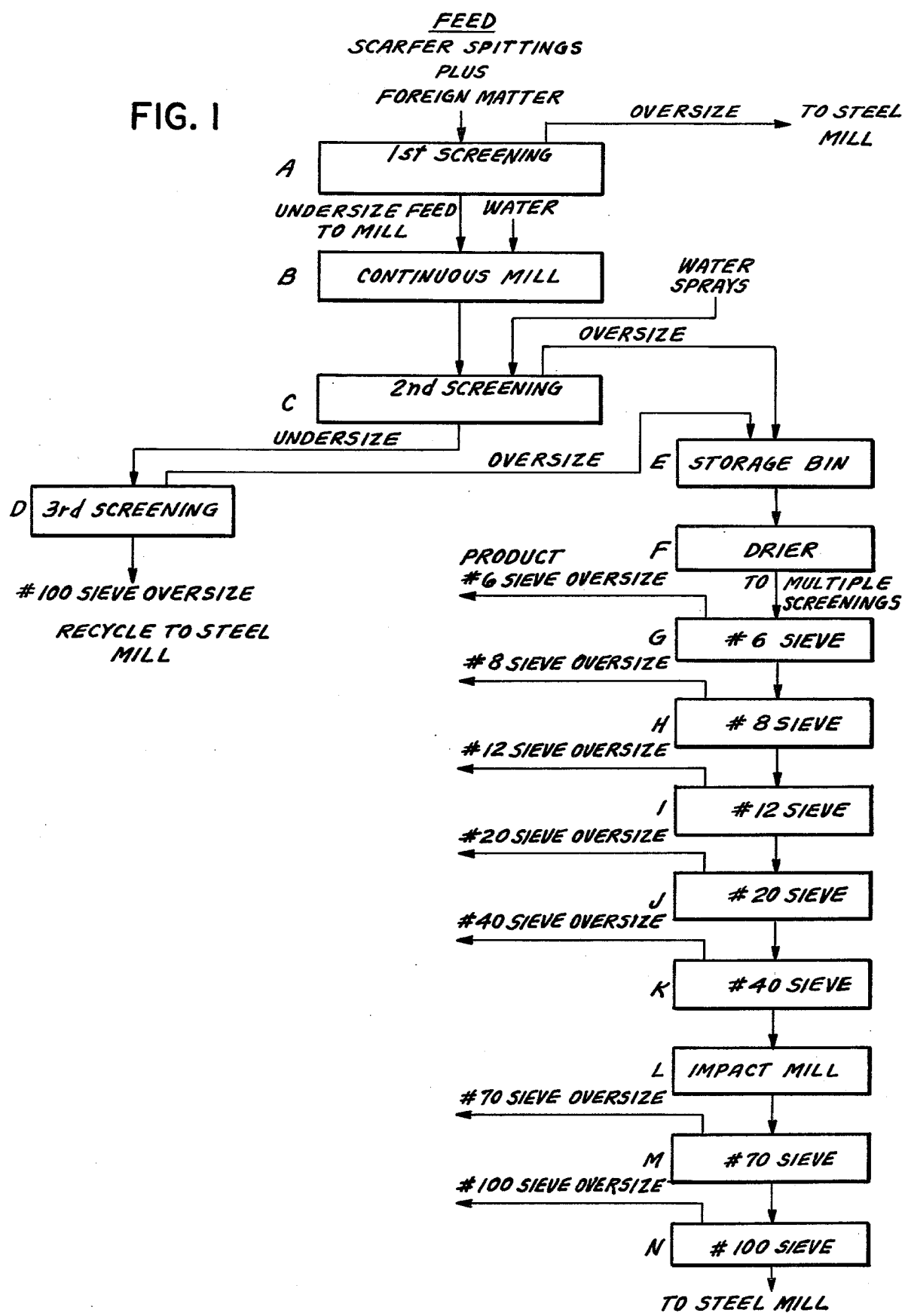
FIG. 1 is a block diagram of a method used to prepare scarfer spittings for use as size-graded metallic abrasives.

In the preferred embodiment of the invention, the scarfer spittings are processed as shown in FIG. 1. The spittings are screened on a grizzly A in a first screening step to remove any large foreign matter which is inadvertently collected with the spittings. The grizzly can have openings which are greater than 6.35 mm (174 inch), however it is preferred to use a grizzly having 6.35 mm openings. Simultaneously, a size separation of the spittings is made at 6.35 mm. The larger or plus 6.35 mm fraction of spittings and the foreign matter are screened (not shown) to separate the foreign matter from the spittings. The spittings then are returned to the steel mill to be used as part of a sinter charge to recover the iron which they contain. The foreign matter is discarded. The smaller or minus 6.35 mm fraction is charged into a continuous rotating grinding mill B, containing appropriate grinding media, such as steel, iron or ceramic balls or pebbles ranging in size from 6.35 mm to 38.1 mm (1½ inches) in diameter. Water sprays are provided in the mill to prevent the formation of dust. The grinding media must be of sufficient size and weight and of a type which when impinged on the surfaces of the spittings, will fracture the brittle outer shells of iron oxides into relatively fine pieces, and will dislodge the pieces from the surfaces of the cores, without materially affecting the shape or the surfaces of the metallic cores. The minus 6.35 mm fraction remains in the mill for a time, usually not less than about eight minutes, so that substantially all the brittle shells of iron oxides will be fractured and removed from the surfaces of the metallic cores. About 20 weight percent of the cores thus freed from the shells have a generally spherical shape and a relatively smooth surface. The remainder or about 80 weight percent of the cores have irregular or sub-angular surfaces, that is, surfaces which have rounded edges or corners. A portion of the mixture of cores and fine pieces of the broken shells and a portion of grinding media which breaks down during service is continuously removed from the mill through a discharge screen (not shown) having appropriate openings, for example a #16 sieve having openings which are 1.19 mm (0.0469 inch). The discharged mixture is screened in a second wet screening step C on a #35 sieve having openings which are 0.030 mm (0.0197 inch) in size to separate substantially all the plus #35 sieve cores from the minus #35 sieve cores, pieces of the shells and grinding media. The plus #35 sieve cores comprise about 40 weight percent of the original feed to the grinding mill. An insignificant quantity of grinding media may remain in the plus #35 sieve fraction. The plus #35 sieve fraction is stored in a storage bin or hopper E. The minus #35 sieve fraction is then screened in a third wet screening step D on a #100 sieve having openings which are 0.0149 mm (0.0059 inch) in size. All the plus #100 sieve fraction is comprised of cores and constitutes about 35 weight percent of the original feed to the mill. The plus #100 sieve fraction is mixed with the plus #35 sieve cores from the second screening step in the storage bin E. The minus #100 sieve fraction of particles of shells and cores, which comprise about 25 weight percent of the feed to the grinding mill, is recycled to the sintering plant of the steel mill wherein iron in the particles and cores is reclaimed. Prior to separating the metallic cores into multiple sizes required for size-graded metallic abrasives, the cores are dried in a suitable drier F, for example a fluid bed drier or a rotary drier at a temperature of not less than about 149° C. (300° F.). The dried metallic cores are then separated or size graded on a series of sieves, G, H, I, J, K, M and N, into various sizes to produce size-graded metallic abrasives according to SAE Shot and Grit Specification J444. In these specifications and claims whenever screen or sieve sizes are used such screen and sieve sizes are U.S. Sieve Series. In the method of the invention in which a continuous grinding mill is used to prepare the spittings as described above, the minus 6.35 mm fraction is continuously fed into the grinding mill at a desired rate, grinding media are added from time to time to maintain a desirable ratio between the spittings and grinding media and a portion of the charge in the grinding mill is continuously extracted to maintain maximum efficiency of grinding and throughput.

Although we have shown and described a treatment arrangement in which scarfer spittings are initially screened on a grizzly having openings which are 6.35 mm in size and in which the product from a continuous mill is screened in two steps, namely on a #35 sieve and then on a #100 sieve, it is within the scope of this invention to initially screen the scarfer spittings on a grizzly having openings larger than 6.35 mm so long as all the foreign matter collected with the scarfer spittings is separated from the scarfer spittings.

It is also within the scope of this invention to screen the product from the grinding mill on as fine a screen as a #120 sieve in step C, however for practical reasons the screening step C is divided into two screen steps C and D using a screen for step C which may be as coarse as a #30 sieve and as fine as a #80 sieve. The use of a sieve which is within the range of #30 to #40 sieve is the most efficient and is preferred. The screen in step D may be as fine as #120 sieve and as coarse as a #90 sieve but to prevent the inclusion of too many fine particles, that is, finer than #100 sieve, which are unsuitable for use as metallic abrasives and for most efficient operation, it is preferred to use a #100 sieve.

Of course, a #120 sieve can be used to produce size-graded metallic abrasives, however such fine particles are not suitable for use as metallic abrasives and it is preferred to use a #100 sieve as the finest size in the size grading of the metallic cores.

As noted above, it is preferred that the spittings be treated in a wet continuous grinding mill using steel, ceramic and the like balls or pebbles. However, it is within the scope of this invention to grind and screen the spittings without the addition of water and to use a batch-type grinding mill using the same type grinding media described above. It is also within the scope of this invention to use an autogenous mill in which the scarfer spittings are used as both the material to be treated and the grinding media required for treatment. If a batch type mill is used, a quantity of spittings is charged into a mill containing the required grinding media. The mill is operated for a period of time, not less than eight minutes. The mill is stopped and the mixture or batch in the mill is removed and processed in a series of screening steps as described above for the continuous wet method. A second batch is then charged into the mill and treated according to the method of the invention.

In the autogenous mill, the spittings fall upon each other with sufficient force to fracture the brittle shells of iron oxides. However, the spittings inadvertently rub against each other in the mill and as a result some of the shells of iron oxides are removed by abrasion. The metallic cores and the broken pieces of the shells are discharged from the mill through a screen having suitable openings as noted previously in the preferred method of the invention. The discharged material is treated in the manner of the invention described above.

It is also within the scope of this invention to prepare the spittings in an impact mill. In the impact mill, the spittings are hurled by a rotor against a target at a desired velocity whereby the outer shells are fractured or broken in a one-point impact but the surfaces of the cores are not changed. The spittings may be prepared by being recycled to the same mill a plurality of times or to a series of mills to insure removal of the shells.

Any of the above mills may be used dry, however, in a dry operation, copious amounts of dust are generated. It is therefore preferred to wet grind the spittings and to wet screen the product of the grinding mill to prevent excessive generation of dust.

It has been found that the smallest size metallic cores minus #40 sieve K having openings of 0.42 mm (0.0165 inch) usually have small pieces of iron oxides adhering to the surfaces when the spittings are treated in any mill except an impact mill. As shown in the FIG. 1, the cores which are smaller than #40 sieve size are impacted by a one-point impact in an impact mill L prior to the final screening steps to remove any adhering iron oxides. The particles of iron oxides which are sufficiently small to pass through all the screenings are recycled to the plant.

The metallic cores prepared by the method of the invention have substantially the same composition as the scarfed steel. Such compositions can be any AISI carbon or alloy grade of steel but are preferably of the low carbon grades having a typical chemical composition of 0.03 to 0.08 weight percent carbon, 0.10 to 0.30 weight percent manganese, under 0.02 weight percent sulfur, under 0.01 weight percent phosphorus, under 0.02 weight percent silicon and the remainder substantially iron and incidental impurities usually associated with such grades of steel. Because the scarfer spittings are washed from the surfaces of the steel with high pressure water into water-filled troughs or tanks, they are effectively quenched. The microstructures and hardness of the particles are usually that of comparable grades of water quenched steel. It is preferred to use scarfer spittings from low carbon grades of steel. Such steels have microstructures of low carbon martensite when quenched and hardnesses of less than $R_c$ 35.

It is well known that steel shot and grit used in machine blast cleaning equipment to clean metallic surfaces are prepared by carefully melting steel to a specified chemical composition containing more than 0.1 weight percent carbon and varying amounts of alloying elements under carefully controlled procedures. The molten steel is tapped at a critical temperature and is formed into small globular-like particles by quenching molten steel with high velocity water or steam. The globules of steel are collected in a water-filled tank and are carefully heat treated to a desired uniform, fine structure and high hardness of about $R_c$ 45 to 60. One example of such method is described in U.S. Pat. No. 2,670,281 to Thomas J. Hutchison, Jr. in which molten steel having 0.10 to 1.70 weight percent carbon, 0.30 to 1.00 weight percent silicon, 0.30 to 2.00 weight percent manganese and other elements such as up to 5.00 weight percent chromium, up to 5.00 weight percent molybdenum, up to 0.40 weight percent vanadium, up to 2.5 weight percent nickel and up to 1.00 weight percent copper are added to obtain desired characteristics. The steel shot so produced has a hardness within the range of $R_c$ 45 to 65. Another method is described in U.S. Pat. No. 2,895,816 to Chalmer R. Cline which describes a method for producing steel shot and grit. The shot is melted to a chemical specification of 1.1 to 1.4 weight percent carbon, 0.40 to 0.90 weight percent silicon and one or more hardening elements such as 1.00 to 1.50 weight percent manganese, 0.50 to 5.00 weight percent chromium, 0.30 to 0.50 weight percent molybdenum, 0.05 to 0.40 weight percent vanadium, 0.50 to 2.50 weight percent nickel and 0.20 to 1.00 weight percent copper and the remainder iron and incidental quantities of impurities. Any oversize shot is converted to useful steel grit. Initial quenching causes the formation of small surface cracks. Raising the carbon content increases the amount of retained austenite and decreases the formation of the surface cracks. If steel grit is to be made, the presence of cracks is an advantage because it is easier to fracture shot having such cracks. The shot disintegrates and breaks down more easily, thus favoring the formation of smaller particles or grit. However, the grit is still high in hardness and is highly stressed thereby leading to early failure during cleaning, resulting in large quantities of particles too small to be of use as metallic abrasives.

The steel shot and grit produced by the above methods have a hardness of $R_c$ 45 to 60, are in a highly stressed condition, have generally smooth surfaces and are susceptible to early failure during use. The metallic abrasives of this invention on the other hand are relatively soft, a large portion of the abrasives have subangular surfaces and are not susceptible to early failure.

Figure 2:
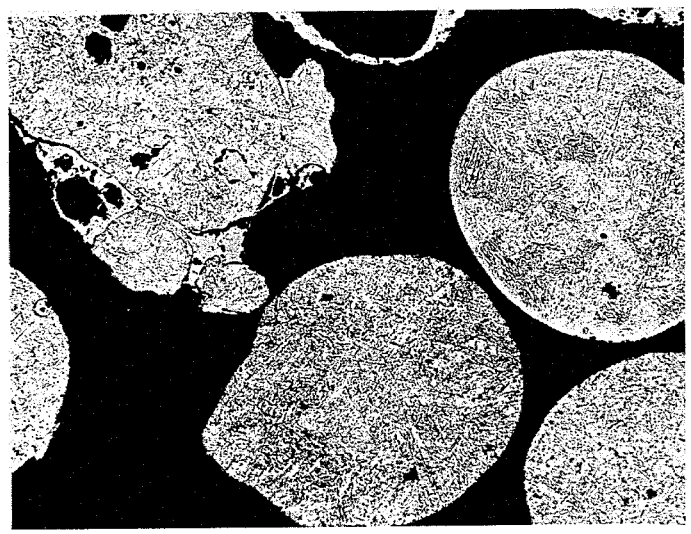
FIG. 2 is a reproduction of a photomicrograph taken at 100 magnifications of metallic cores prepared by the method of the invention.
Figure 3:
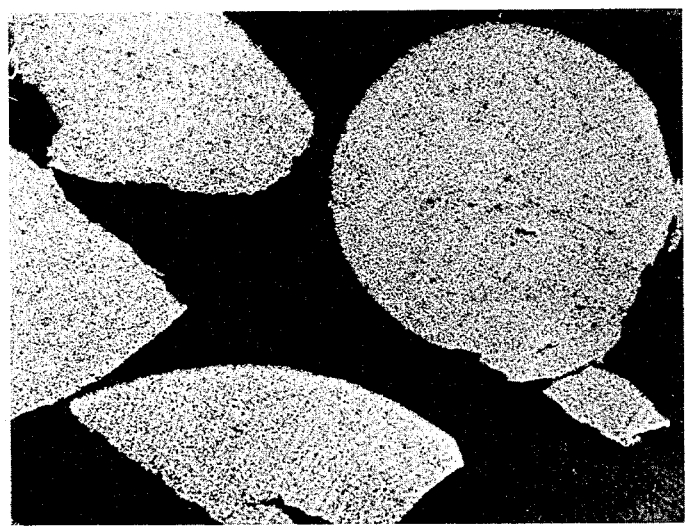
FIG. 3 is a reproduction of a photomicrograph taken at 100 magnifications of prior art steel abrasives.

Turning now to the FIGS. 2 and 3, a typical microstructure of the metallic cores produced by the method of the invention is shown in FIG. 2 and a typical microstructure of a commercially available steel abrasive is shown in FIG. 3. The cores and abrasives have a size of minus #20 sieve, plus #40 sieve. The microstructures of the metallic cores shown in FIG. 2 comprise lath-like untempered martensite substantially devoid of any retained austenite having a grain size of between 3 and 4 as determined by ASTM E112-63 "Estimating the Average Grain Size of Metals", plate 1. The metallic cores are substantially free from integranular and intragranular cracking. The microstructures of the commercially available metallic abrasive, shown in FIG. 3, comprise plate-like tempered martensite with areas of alloy segregation and carbides and a grain size of about 7–8 and intragranular microcracks extending across the plates of the tempered martensite.

Typical chemical compositions of the cores and commercial abrasives can be within the ranges shown below:

| Elements | (Weight Percent) | |
| --- | --- | --- |
| | Cores | Abrasives* |
| Carbon | .04 to .08 | .75 to 1.2 |
| Manganese | .10 to .25 | — |
| Phosphorous | .010 to .018 | 0.05 max. |
| Sulfur | .010 to .015 | 0.05 max. |
| Silicon | .01 max. | .4 to 1.5 |
| Iron | 94 to 98 Rem. Incidental Impurities & Oxygen. | Rem. Iron & Alloy Additions as specified. |

*Steel Founders Society Specification SFFA20-66

The hardness of the metallic cores was between $R_c$ 20 and 35 with segregated areas of about $R_c$ 45 while the commercially available steel abrasives were heat treated to obtain a hardness of $R_c$ 45 to 60. The intragranular microcracks in the commercially available steel abrasives can and do act as stress points particularly when used in high stress applications causing transverse cracking across the grains of the abrasives leading to early failure of the abrasives.

The metallic cores prepared by the method of the invention can be used in modern equipment to machine or manually blast clean the surface of metallic and nonmetallic material. The time required to machine blast clean the surface of a ferrous metal with the metallic cores is somewhat shorter than the time required when using conventional commercially prepared steel shot or grit of comparable size. The presence of both substantiallly smooth surfaced spherical metallic cores and irregularly shaped metallic cores results in a machine blast cleaned surface which has a surface profile intermediate between the surface profile formed by using steel shot or the surface profile formed by using steel grit.

The breakdown rate or impact resistance of the metallic cores prepared by the method herein described and a commercially available metallic abrasive grit having a $R_c$ 45–60 were compared as described in "Metallic Shot and Grit Mechanical Testing-SAE 445A" appearing in the SAE Handbook, 1976, of the Society of Automotive Engineers, dated 1976. The test was conducted on an Ervin Test machine as outlined and shown in Bulletin 644 of the Alloy Metal Abrasives Division of Ervin Industries, 121 S. Division Street, Ann Arbor, Michigan. In the test, a measured amount of a screened metallic abrasive of known size is prepared. One hundred grams of the abrasive is charged into the test machine. The test machine has a throwing arm which rotates 6900 revolutions per minute, and an anvil and recirculating device which rotate around the throwing wheel on the same axis at 25 revolutions per minute. Each particle of abrasive is subjected to one impact each time the anvil and recirculating device rotate. The number of rotations are counted to show the impacts the abrasive can absorb.

The 100 grams (0.22 pounds) of abrasive are subjected to a number of impacts. The machine is stopped and the abrasive particles are removed from the machine and carefully screened to remove all the fine particles from the sample. The remaining abrasives are weighed and a sufficient amount of fresh abrasive needed to bring the sample up to 100 grams is added. The 100 gram sample is then subject to another known plurality of impacts and the procedure is repeated until about 100 weight percent of the test abrasives have been replaced. The results of the comparison tests on a G-40 grit are shown below:

| No. of Impacts | Weight Percent Loss | | Cumulative Weight Percent Loss | |
| --- | --- | --- | --- | --- |
| | Commercial | Metallic Cores | Commercial | Metallic Cores |
| 250 | 16.8 | 4.6 | 16.8 | 4.6 |
| 500 | 10.0 | 6.4 | 26.8 | 11.0 |
| 750 | 8.7 | 7.5 | 35.5 | 18.5 |
| 1000 | 8.3 | 9.0 | 43.8 | 27.5 |
| 1250 | 8.1 | 10.1 | 51.9 | 37.6 |
| 1500 | 9.2 | 10.0 | 61.1 | 47.6 |
| 1750 | 8.8 | 11.2 | 69.9 | 58.8 |
| 2000 | 9.7 | 11.5 | 79.6 | 70.3 |
| 2250 | 9.5 | 11.6 | 89.1 | 81.9 |
| 2500 | 10.0 | 11.6 | 99.1 | 93.5 |

After 2500 impacts almost 100 weight percent of the original amount of the commercial metallic grit abrasive had been replaced whereas only 93.5 weight percent of the metallic cores had been replaced, indicating that the metallic cores herein described were more resistant to impact than the same size commercially available steel grit.

In an example of the invention, 29,937.1 kilograms (66,000 pounds) of scarfer spittings were screened on a 6.35 mm screen to separate plus 6.35 mm spittings and foreign matter from minus 6.35 mm spittings. Less than 1 weight percent of the total feed was larger than 6.35 mm. The remaining 29,710.3 kilograms (65,500 pounds) passed through the screen. These relatively finer particles were charged at a rate of 680.4 kilograms per hour (1500 pounds per hour) along with 151.4 liters per hour (40 gallons per hour) water into a wet mill containing 453.6 kilograms (1000 pounds) of steel balls which ranged in size from 6.35 mm to 25.4 mm in diameter. The resultant mixture of spittings and water was continuously discharged from the mill onto a #35 sieve. About 40 weight percent of the spittings feed was retained on the sieve. The remaining 60 weight percent passed through the sieve. The chemical analyses of the plus #35 sieve product are as follows:

| Element | Product Retained on #35 Sieve Weight Percent | Product Passing Through #35 Sieve Weight Percent |
| --- | --- | --- |
| C | 0.05 | 0.04 |
| Mn | 0.10 | 0.49 |
| P | 0.017 | 0.013 |
| S | 0.010 | 0.016 |
| Si | <0.01 | 0.03 |
| Fe | 96.3 | 78.7 |

Remainder incidential impurities and oxygen

The metallic cores retained on the #35 sieve were dried and sized into typical SAE cast steel shot size ranges.

The particles passing through the #35 sieve were further screened on a #100 sieve to remove the fine oxide shells. The product retained on the #100 sieve was dried and passed through a dry impact mill to remove additional oxides from the finer metallic cores. The product from the dry impact mill was screen on a #70 and #100 sieve.

The chemistry of the products retained on the #70 and #100 sieves is as follows:

| Element | Product Retained on #70 & #100 Sieve Weight Percent | Product Passing Through #100 Sieve Weight Percent |
|---|---|---|
| C | 0.05 | 0.09 |
| Mn | 0.10 | 0.53 |
| P | 0.017 | 0.013 |
| S | 0.010 | 0.016 |
| Si | <0.01 | 0.04 |
| Fe | 96.3 | 74.9 |

Remainder incidental impurities and oxygen.

Microscopic examination of a representative sample of the metallic cores was made at 100 diameters. The microstructure consisted of untempered lath-like martensite. No evidence of intragranular cracks was detected. The hardness was between 28 and 32 $R_c$.

The metallic cores were size-graded on a series of sieves. The weight percent of the cores retained on each sieve is shown below:

| Sieve # | Weight Percent |
|---|---|
| 6 | 0.9 |
| 8 | 1.6 |
| 12 | 2.1 |
| 20 | 9.0 |
| 40 | 14.7 |
| 70 | 8.4 |
| 100 | 4.1 |

The remaining 59.2 weight percent consisted of particles of shells.

Representative samples of the metallic cores were subjected to a durability test in an Ervin breakdown test. Samples of the metallic cores were recycled between 2700 and 3000 times in the test. The results compare favorably with commercially available steel shot and grit.

The cleaning action of metallic cores produced by beneficiating scarfer spittings was compared to the cleaning action of standard SAE 280 grade steel shot. To compare the cleaning action of the abrasives, the surface of a steel plate 1.22 meters by 2.44 meters by 9.5 millimeters (4 feet by 8 feet by ⅜ inch) covered with mill scale and patches of rust was divided into two equal parts. One part was cleaned with the metallic cores of the invention and the other part was cleaned with the steel shot. The abrasives were impinged onto the surfaces to be cleaned through a hand-held compressed air nozzle having an opening of 6.35 mm at a pressure of 7.03 kilograms per square centimeter (100 pounds per square inch). The nozzle was held about 20.32 to 30.48 centimeters (8 to 12 inches) away from the surfaces of the steel plate in a position perpendicular to the surfaces. The results of the cleaning action are shown below in Table I:

Table I

Comparison of Cleaning Action of Metallic Cores and Standard SAE 280 Steel Shot

| | Metallic Cores | SAE 280 Steel Shot |
|---|---|---|
| Quantity of Abrasive Used | 2.9 pounds per sq. ft. (14.16 kilograms per sq. m.) | 3.5 pounds per sq. ft. (17.09 kilograms per sq. m.) |
| Particle Size of Abrasive | 16 by 50 Sieve (U.S.S.) | 16 by 40 Sieve (U.S.S.) |
| Surface Cleanliness | Near White | Near White |
| Cleaning Rate | 240 sq. ft. per hr. (22.3 sq. m./hr.) | 205 sq. ft. per hr. (19.1 sq. m./hr.) |
| Profile of cleaned Surface | 2.5–3 mils (63.5–76 microns) | 2–3 mils (51–76 microns) |

From the results of the test, it can be seen that a smaller amount of the metallic cores obtained by treating scarfer spittings cleaned a greater surface area in less time than a larger amount of commercially produced metallic abrasives. The profile produced by the metallic cores was equivalent to the profile produced by the commercial metallic abrasives.

I claim:

1. A method for preparing scarfer spittings comprised of steel cores enclosed in shells of iron oxides and being within a size range of plus 50.8 mm to about minus #100 sieve size for use as size-graded steel abrasives useful in blast cleaning metallic and non-metallic surfaces, comprising:
   (a) screening said scarfer spittings in a first screening step to separate large non-usable spittings from smaller spittings and to remove foreign matter,
   (b) charging said smaller spittings into a grinding mill,
   (c) removing said shells of iron oxides from around said cores of said smaller spittings in said mill,
   (d) screening the mixture produced in step (c) in a second screening step to separate said steel cores from said iron oxide shells,
   (e) drying said steel cores, and
   (f) screening said steel cores in a third screening step to produce a size-graded metallic abrasive product.

2. A method for beneficiating a waste product comprised of particles within a size range of plus 50.8 mm and minus #100 sieve size and characterized by a dual structure of steel cores enclosed in brittle shells of iron oxides for use as size-graded abrasives suitable for blast cleaning metallic and non-metallic surfaces, comprising:
   (a) screening said waste product to make a size separation at about 6.35 mm size,
   (b) recycling the plus 6.35 mm fraction to recover iron contained therein,
   (c) charging the minus 6.35 mm fraction into a grinding mill,
   (d) rotating said grinding mill for a time whereby said brittle shells are fractured and removed from the surfaces of said cores,
   (e) discharging said fractured brittle shells and said cores from said grinding mill,
   (f) screening said fractured brittle shells and said cores to make a size separation at about #30 to #40 sieve, (g) storing the plus #30 to #40 sieve size fraction,
(h) screening the minus #30 to #40 sieve size fraction to make a size separation at about #100 to #120 sieve,
(i) recycling the minus about #100 to #120 sieve fraction to recover the iron contained therein,
(j) mixing the plus about #100 to #120 sieve fraction with the plus #30 to #40 sieve fraction of step (g),
(k) screening the mixture of step (j) on a series of sieves to produce size-graded steel abrasives.

3. The method of either of claims 1 or 2 in which the mill in step (c) is a ball mill.

4. The method of either claims 1 or 2 in which the mill in step (c) is a pebble mill.

5. The method of either claims 1 or 2 in which the mill in step (c) is an autogeneous mill.

6. The method of either of claims 1 or 2 in which water is added to said mill in step (d).

7. The method of claim 3 in which the grinding media are steel balls.

8. The method of claim 3 in which the grinding media are ceramic balls.

9. The method of claim 4 in which the grinding media are steel pebbles.

10. The method of claim 4 in which the grinding media are ceramic pebbles.

11. The method of either of claims 1 or 2 in which the scarfer spittings are charged into a batch mill in step (c).

12. The method of either of claims 1 or 2 in which the scarfer spittings are charged into a continuous mill in step (c).

13. A size-graded steel abrasive material for blast cleaning metallic and non-metallic surfaces characterized by having a hardness within the range of $R_c$ 20 to 35, a microstructure comprised of untempered lath-like martensite substantially free from intergranular and intragranular cracking, a grain size of about 3 to 4 and having an impact toughness equivalent to that of higher carbon and alloy grades of metallic abrasives.

14. In a size-graded steel abrasive suitable for blast cleaning metallic and non-metallic surfaces made from a waste product comprised of a dual structure of steel cores enclosed in a shell of iron oxides and having particles within a size range of plus 50.8 mm to minus #100 sieve size wherein said waste product is screened, subjected to grinding in a rotating mill to remove said shells from said cores, screened, dried and size-graded on a series of sieves, said steel abrasive characterized by having a microstructure of untempered lath-like martensite substantially free from intergranular and intragranular cracking, a grain size of 3 to 4, a hardness of $R_c$ 20 to 35, and having about 20 weight percent spherical particles with smooth surfaces and about 80 weight percent particles having irregular surfaces.

15. A method for producing a steel abrasive from scarfer spittings comprised of steel cores enclosed in shells of iron oxides, said abrasives characterized by having a microstructure comprised of untempered lath-like martensite, substantially free of retained austenite and carbides and intragranular cracking and intergranular cracking, a hardness of between about $R_c$ 20 and $R_c$ 35, and comprised of 20 weight percent generally spherical particles having smooth surfaces and 80 weight percent particles having irregular surfaces, said method comprising:
(a) separating substantially all scarfer spittings having a size of larger than about 6.35 mm from all scarfer spittings having a size of less than about 6.35 mm in a first screening step,
(b) charging the less than about 6.35 mm spittings and grinding media into a grinding mill,
(c) rotating the grinding mill to cause said grinding media to contact said spittings to fracture said shells into relatively fine particles to thereby remove said shells from surfaces of said cores,
(d) discharging said shells and said cores from said mill,
(e) separating said shells and all cores finer than about #30 to #40 sieve from substantially all cores coarser than about #30 to #40 sieve in a second screening step,
(f) storing the coarser than about #30 to #40 sieve cores,
(g) screening the finer than about #30 to #40 sieve fraction on about a #100 to #120 sieve to separate the about plus #100 to #120 sieve cores from all about minus #100 to #120 sieve particles in a third screening step,
(h) passing said about plus #100 to #120 sieve cores to storage with the coarser than about #30 to #40 sieve cores from step (f),
(i) charging said mixture of cores from step (h) into a dryer,
(j) drying said mixture at about 149° C. to remove all the moisture from said mixture, and
(k) screening the dried mixture on a series of screens to separate the cores into a plurality of sizes.

16. A method for producing steel abrasive from scarfer spittings, comprising:
(a) screening the scarfer spittings to separate oversize spittings from undersize spittings suitable for forming abrasive for blast cleaning metallic surfaces,
(b) recycling the oversize spittings to recover the iron content,
(c) subjecting the undersize spittings to a physical treatment to fracture and remove the outer oxide shells from the surfaces of the cores of the spittings,
(d) screening the cores and fractured shells to make a size separation within the range of #90 to #120 sieve size to separate an undersize from the oversize fraction,
(e) recycling the undersize fraction of step (d) consisting essentially of particles of shells to recover the iron in said fraction,
(f) screening the oversize fraction of step (d) on a series of sieves to produce a size-graded series of steel abrasives.

17. A method according to claim 16 additionally comprising screening the cores and fractured shells from step (c) to make a size separation within the range of #30 to #80 sieve size and removing the oversize fraction prior to subjecting the undersize fraction to the screening operation of step (d) and recombining the #30 to #80 sieve oversize fraction with the #90 to #120 oversize fraction from step (d) prior to screening in step (f) to produce a size-graded series of steel abrasives.

18. A method according to claim 17 wherein the additional screening prior to the screening operation of step (d) is effected using a sieve size between #30 and #40.

19. A method according to claim 18 wherein the additional screening is effected using a #35 sieve size.

20. A method according to claim 18 wherein the screening operation of step (d) is effected using a #100 sieve size.

* * * * *